United States Patent [19]
Kirk

[11] Patent Number: 6,065,580
[45] Date of Patent: May 23, 2000

[54] HEAVY DUTY FREEWHEEL HUB FOR BICYCLES

[76] Inventor: Friedrich Kirk, 1492 E. 8th St., Chico, Calif. 95928

[21] Appl. No.: 09/138,837

[22] Filed: Aug. 24, 1998

[51] Int. Cl.[7] ...................................................... F16H 3/44
[52] U.S. Cl. .......................................... 192/217.3; 192/64
[58] Field of Search .................................. 192/64, 217.3, 192/217

[56] References Cited

U.S. PATENT DOCUMENTS

| | | | |
|---|---|---|---|
| 2,081,568 | 5/1937 | Winkler | 192/217.3 |
| 2,953,945 | 9/1960 | Gleasman | 192/217.3 |
| 2,985,269 | 5/1961 | Gleasman | 192/217.3 |
| 3,828,627 | 8/1974 | Schwerdhofer | 192/217.3 |
| 3,972,245 | 8/1976 | Allen | 74/243 R |
| 3,985,391 | 10/1976 | Hoffman et al. | 301/6 V |
| 4,226,317 | 10/1980 | Nagano et al. | 192/64 |
| 4,299,318 | 11/1981 | Segawa | 192/64 |
| 4,324,323 | 4/1982 | Campagnolo | 192/64 |
| 4,461,375 | 7/1984 | Brown | 192/64 X |
| 4,580,670 | 4/1986 | Nagano | 192/64 |
| 4,593,799 | 6/1986 | Ozaki | 192/64 X |
| 4,711,331 | 12/1987 | Hoffmann | 192/64 X |
| 4,913,500 | 4/1990 | Wauke et al. | 192/64 X |
| 5,324,100 | 6/1994 | James | 301/110.5 |
| 5,332,294 | 7/1994 | Haeussinger | 301/110.5 |
| 5,433,306 | 7/1995 | Yang | 192/64 |
| 5,458,223 | 10/1995 | Chen | 192/64 |
| 5,480,357 | 1/1996 | Liang | 474/77 |
| 5,485,905 | 1/1996 | Rader | 192/64 |
| 5,515,957 | 5/1996 | McConaghy | 192/64 |
| 5,626,401 | 5/1997 | Terry et al. | 301/110.5 X |
| 5,632,364 | 5/1997 | Mercat | 192/64 |
| 5,676,227 | 10/1997 | Hügi | 192/64 |
| 5,718,315 | 2/1998 | Chen | 192/64 |
| 5,738,197 | 4/1998 | Kroger et al. | 192/64 |

FOREIGN PATENT DOCUMENTS 666 454 A5 of 1988 Switzerland ................... F16D 41/30

*Primary Examiner*—Charles A. Marmor
*Assistant Examiner*—Ha Ho

[57] ABSTRACT

A hub assembly for a bicycle wheel is comprised of two spaced flanges for connection to the spokes of a wheel and a tubular center section. One flange is provided with a circular array of holes for mounting a disk brake rotor. The opposite flange is provided with an internal spline axially aligned and housed within the hub. Said spline slidably engages with a spline on a ring pawl member, which has ramped teeth on a surface facing a tubular sprocket carrier. The teeth on said ring pawl member interact with corresponding teeth on said tubular sprocket carrier to create a unidirectional clutch mechanism. Said tubular sprocket carrier is also provided with external splines to accept industry standard toothed sprockets. The clutch mechanism and bearings are arranged so as to allow a large diameter sleeve axle to fit unrestricted within the confinement of the industry standard drive sprocket's internal splines. A large diameter (20 mm or larger) through axle can then pass through said sleeve axle with no restrictions.

11 Claims, 3 Drawing Sheets

HEAVY DUTY FREEWHEEL HUB FOR BICYCLES

BACKGROUND OF THE INVENTION

1. Field of the Invention

The invention relates to a freewheel hub and through axle for bicycles, such as used for the wheel of the bicycle driven by a chain or the like. Such a hub transmits the driving force from the sprocket to the wheel while the bicyclist is pedaling, but allows free rotation of the wheel while the bicyclist is not pedaling.

2. Description of Prior Art

The basic design and functional requirements of the bicycle have existed for over one hundred years. However, the recent employment of the bicycle, particularly of the type BMX (Bicycle Moto-Cross), mountain bikes, off road tandems, and downhill racing, has greatly increased the demand for improved component performance. Even though the demand for higher performance has increased significantly, rear hub design has remained basically the same since the invention of the freewheel. Performance can be improved by reducing weight, increasing efficiency, or improving reliability.

The demands on rear hubs required by tandem teams have caused many failures of clutch mechanisms. Often tandem teams can weigh over 400 pounds, and can generate tremendous torque. Tandems are also being used off-road; and the terrain itself requires much more of the components. BMX and downhill racing also require a solid clutch mechanism due to the high momentary loads induced when a rider sprints.

Bicycles are being raced in the most inhospitable conditions. Often mountain bike races will take place in the snow, mud, and rain. Equipment is expected to perform flawlessly, race after race, with little maintenance. Most current designs have inadequate seals and require complete disassembly for cleaning and regreasing.

Most recently it has been recognized by frame designers that the rear hub, particularly the axle, can be an integral part of the bicycle frame. Many rear suspension designs are not adequately braced, and when standard hubs are used can experience instability and even catastrophic failure.

OBJECTS AND ADVANTAGES

It is therefore a general object of the present invention to provide a rear hub for bicycles that can incorporate both a stronger axle and stronger clutch than found on known systems.

It is an object of the present invention to accommodate a 20 mm or larger axle with provisions for a 20 mm or larger through axle with NO reductions in diameter.

It is an object of the present invention to accommodate industry standard drive sprocket wheels down to 11 teeth.

It is an object of the present invention to seal the entire unit against entry of water and dirt.

It is an object of the present invention to allow for easy disassembly with standard tools for periodic maintenance.

DETAILED DESCRIPTION OF THE INVENTION

Figure 2:
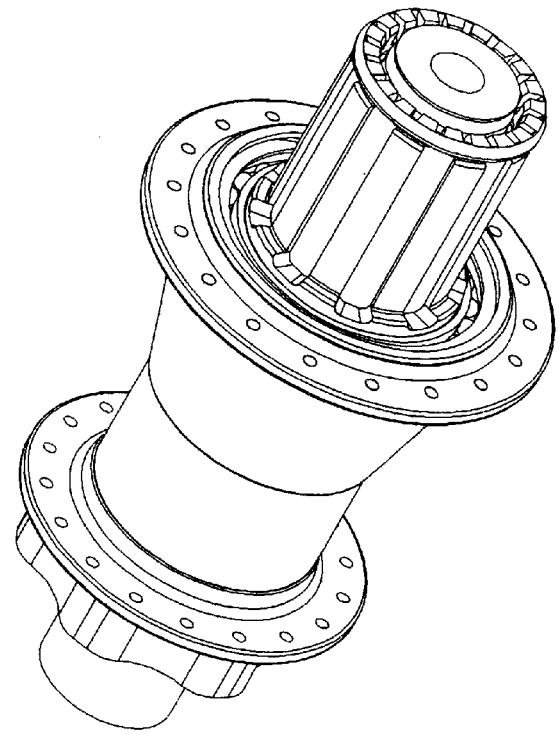
FIG. 2 is a front view of the present invention, showing the bolt on configuration.
Figure 1:
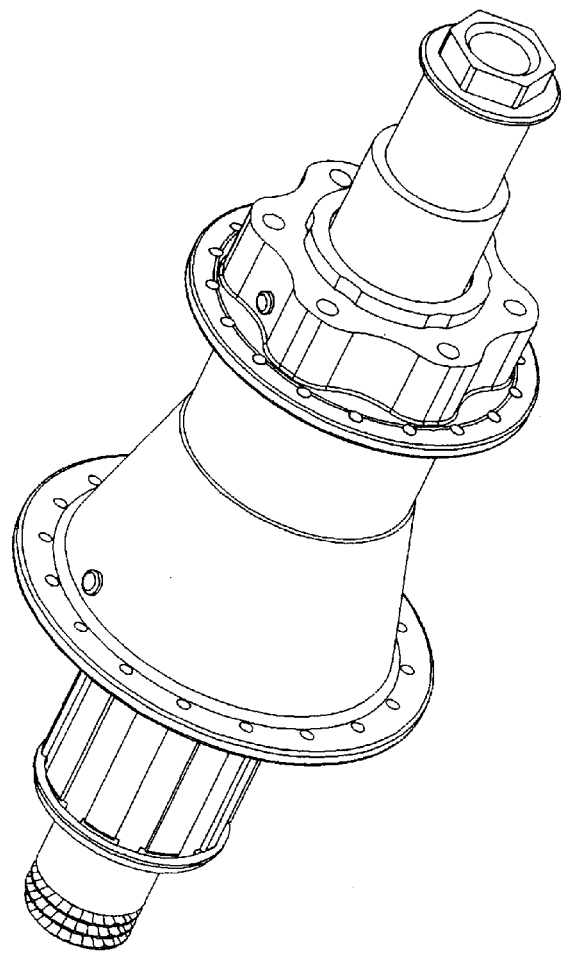
FIG. 1 is a rear view of the present invention, showing a through axle.
Figure 3:
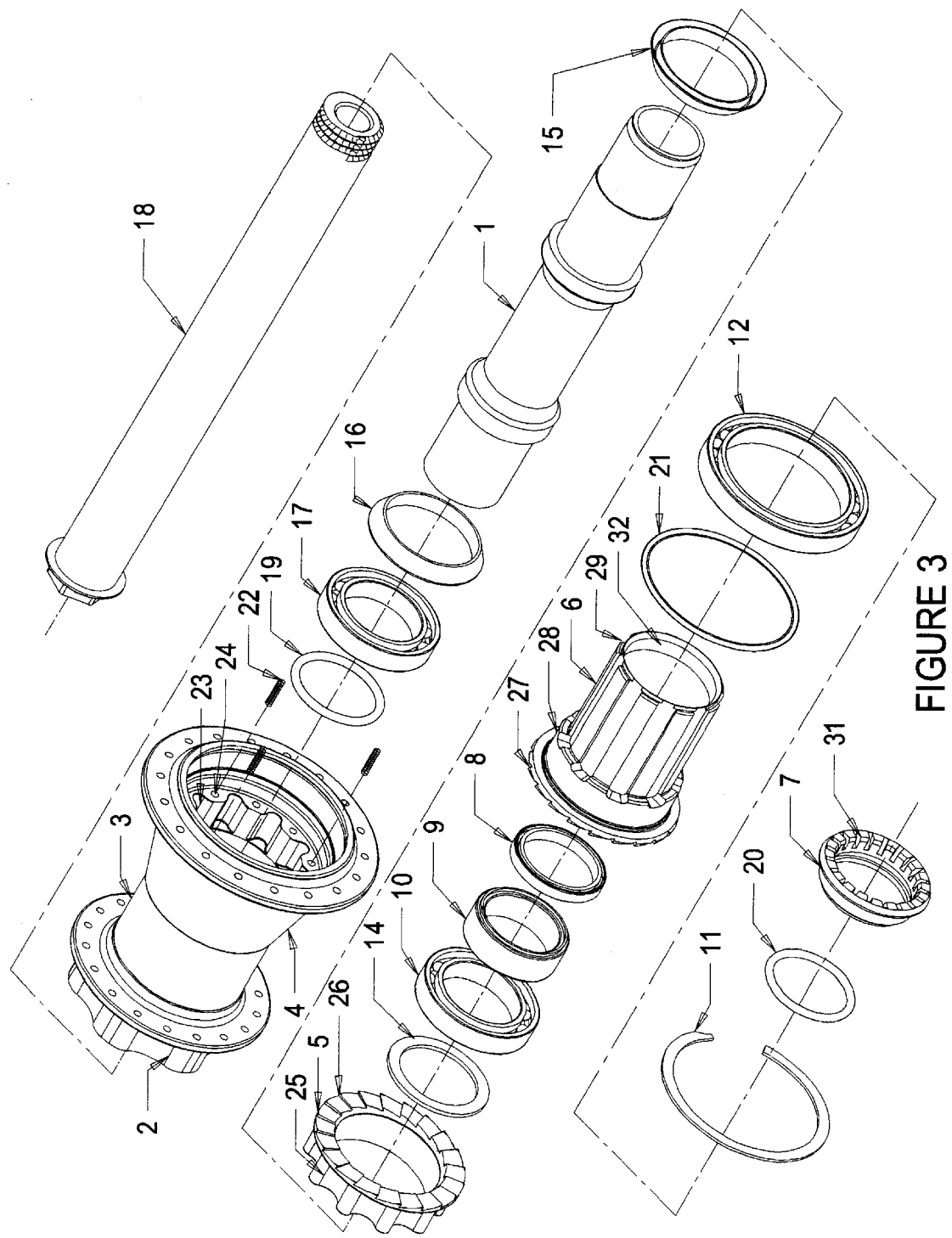
FIG. 3 is an exploded view of the present invention, showing a through axle.
Figure 4:
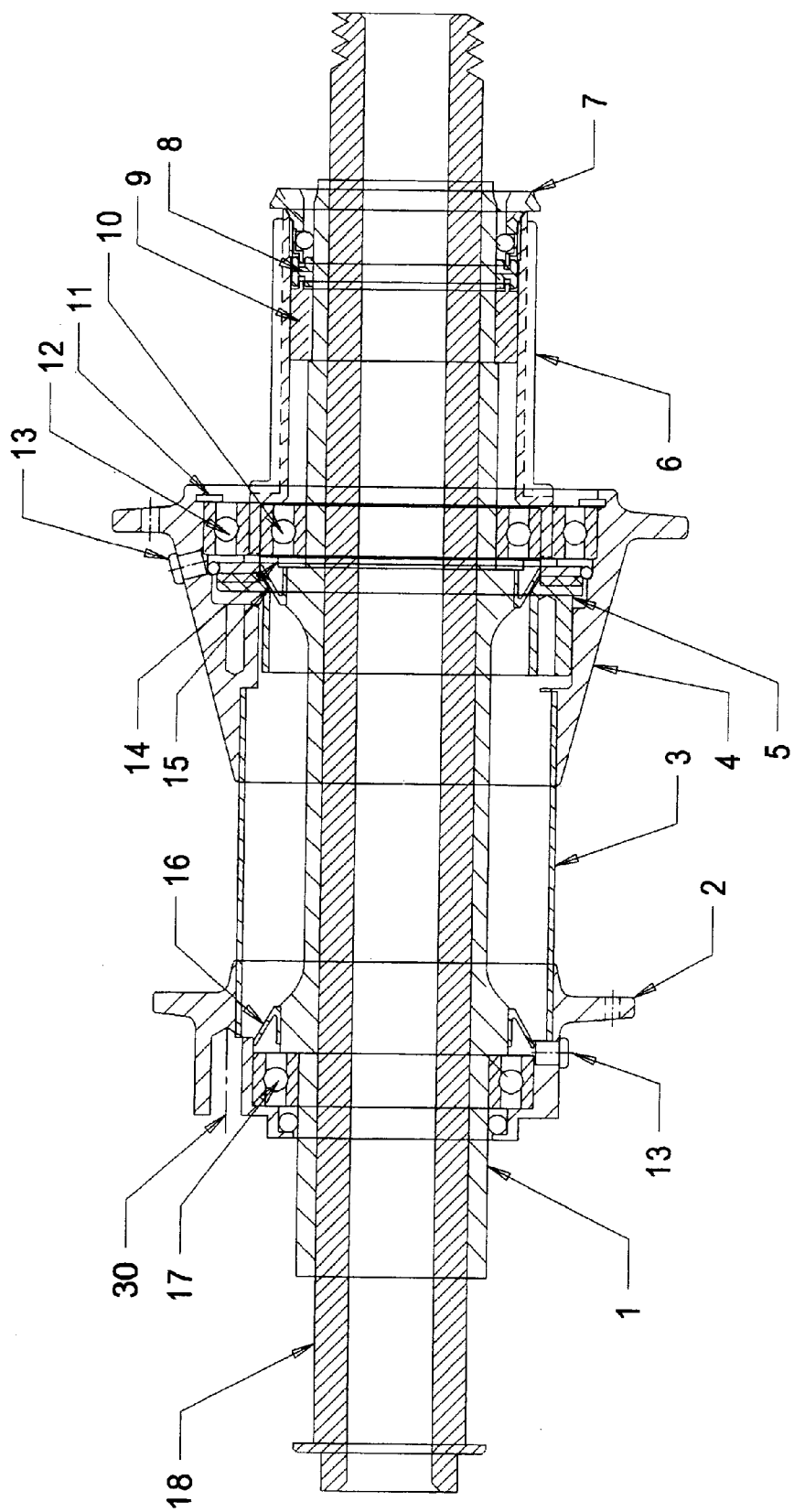
FIG. 4 is a sectional front view of the present invention, showing a through axle.

As shown in FIG. 3, the freewheel hub includes a largely cylindrical hub unit composed of an aluminum brake flange 2 joined by a carbon fiber shell 3 to a hard anodized aluminum drive flange 4. Although this is the preferred embodiment of these members, it is recognized that these members could be made of any suitable material. In another embodiment of the invention, these members could be constructed of one piece of material. The drive flange 4 and the brake flange 3 are provided with holes for receiving a plurality of spokes of a bicycle wheel.

Brake flange 2 is provided with a radial array of threaded holes 30 arranged around the axle center to receive a disk brake rotor. Another embodiment of the invention would not feature these holes if a disk brake is not required Brake flange 2 is provided with an annular cavity to receive roller bearing 17 which is mounted on sleeve axle 1. A second coaxial annular cavity is provided externally adjacent to the aforementioned cavity for sealing ring 19 to ensure against water ingress.

Drive flange 4 has an internal spline 23 that is slidably engaged with the spline 25 on ring pawl 5. A radial array of holes 24 is positioned in the lobes of the spline and contain a plurality of coil springs 22 which act to axially displace the ring pawl 5 with respect to drive flange 4. An annular recess receives roller bearing 12, while an annular groove contains retaining ring 11. Retaining ring 11 is constructed so that disassembly of the hub can be achieved with a screwdriver.

Ring pawl 5 features a spline 25 that slidably engages with the spline 23 of drive flange 4. Axially opposite the spline is a plurality of ramped teeth 26 arranged radially on the surface facing the sprocket body 6. This toothed face interlocks with a matching toothed face on sprocket body 6.

Sprocket body 6 is provided with a series of splines 29 to engage with one or more industry standard sprocket wheels (not shown) for receiving the drive chain. Torque from pedaling effort is transmitted via shoulder 28 between roller bearings 10 and 12 to a plurality of ramped teeth 26 arranged radially on the surface facing ring pawl 5. Ring pawl 5 and sprocket body 6 form a clutch such that a rotationally rigid connection is provided in one relative rotational direction, while in the opposite rotational direction the faces are forced apart, restrained by springs 22, whereby allowing free rotation. A sealing ring 21, which is seated on a groove adjacent to the toothed face, acts to restrict the ingress of excess grease from roller bearing 12 onto the toothed face Roller bearing 12 is press fit to the outside of shoulder 28 and roller bearing 10 slides concentrically with roller bearing 12 into the annular recess inside shoulder 28. Roller bearing 10 is then located on sleeve axle 1 by preload spring 14. Arranged thus, there is a direct load path from drive flange 4 to sleeve axle 1, minimizing lateral shear on sprocket body 6. This arrangement also allows roller bearings 10 and 12 to be as large as possible, unconstrained by the sleeve axle 1 size or drive cog size. Plain bearing 9 is press fit into an annular cavity within the spline section of sprocket body 6 to support lateral loads from drive chain tension. The aforementioned plain bearing rotates around sleeve axle 1 and features a lip which interlocks with a groove on the face of seal 8 which is pressed on to sleeve axle 1. The two components cooperate to form a labyrinth seal to keep mud-and water out of the drive mechanism.

Retaining ring 7 screws onto sprocket body 6, axially constraining sprocket wheels (not shown). An annular groove is provided in retaining ring 7 for sealing ring 20 which rotates around and in contact with sleeve axle 1. Splines 31 in retaining ring 7 engage with industry standard Shimano (tm) bottom bracket tool (not shown), allowing easy removal for sprocket wheel replacement.

Sleeve axle 1 is provided with shoulders to positively locate bearings 10 and 17. Seals 15 and 16 are located on these shoulders and rotatably contact the inner walls of the annular cavities for bearings 10 and 17 respectively. In one embodiment, sleeve axle 1 features a large diameter (at least 20 mm or larger) hole to freely accept, without any reductions in diameter, through axle 18. Another embodiment features threaded holes on each end to receive bolts for fastening the hub to standard frame forks.

Through axle 18 is a large diameter (20 mm or larger) cylinder which does not require any reductions in diameter so as to fit into sleeve axle 1. The aforementioned axle may feature threads for affixing to a rear suspension frame member on one side, and a shoulder with wrench flats on the opposite side. While it is recognized that through axle 18 does not need to provide these features, they are provided on this embodiment. Through axle 18 is affixed (by clamping, threading onto, etc.) to the right and left rear frame members, particularly on a suspension bike.

Grease fittings 13 are located on the drive flange 4 and brake flange 2 so as to provide positive grease pressure for roller bearings 10, 12, and 17 as well as plain bearing 9. Grease is prevented from filling the hub cavity by seals 15, 16, and 21.

SUMMARY, RAMIFICATIONS, AND SCOPE

Moving the freewheel into the large diameter hub shell allows a large diameter face-tooth clutch and a large diameter axle. The benefits of a large diameter freewheel are compounding. A large diameter allows more teeth. Also for a given torque transfer, the necessary force on each tooth is reduced.

Sprocket carrier body is supported by one ball bearing and one sleeve bearing. This allows a maximum axle diameter and a minimum sprocket diameter The sprocket carrier will accept industry standard sprockets. The sprocket lock ring uses tools currently employed to install bottom bracket bearings, thus reducing the need for special tools.

The unit allows a 20 mm through axle with no decreases in diameter. AU loads exerted on the frame can be accommodated by the through axle. This allows for a rigid frame-axle connection, and removes the hub itself as a primary load bearing member.

The drive side hubshell bearing and sprocket carrier bearing are concentric, allowing a direct load path to the large diameter axle.

The unit is held together with a snap ring. This ring can be easily removed with a standard screwdriver, allowing easy access for maintenance.

The drive side flange incorporates part of the clutch mechanism to allow for manufacturing simplicity and save weight by employing fewer parts.

The brake side flange incorporates a bolt pattern to allow for disk brakes.

The entire unit is sealed from external dirt and water by employing sealed ball bearing units and o-rings or the like. In addition, a positive pressure lubrication system is provided for easy maintenance. Lubricant is directed to the bearings by channels and seals.

Although the description above contains many specificities, these should not be construed as limiting the scope of the invention, but as merely providing illustrations of some of the presently preferred embodiments of this invention.

Thus the scope of the invention should be determined by the appended claims and their legal equivalents, rather than by the examples given.

What is claimed is:

1. A free-wheel hub for a bicycle comprising:
    a hub shell, said hub shell a tubular member having a first end and a second end;
    a sleeve axle having an external diameter, a first end region, a second end region, and a hole; said sleeve axle positioned within said hub shell and rotatable relative to said hub shell;
    a first roller bearing interfacing between the first end of said hub shell and the first end region of said sleeve axle;
    a sprocket body having a first end and a second end and further having a central through bore larger than the external diameter of said sleeve axle; said sprocket body having splines for receiving sprocket wheels; said sprocket body positioned about said sleeve axle with the first end of said sprocket body within the second end of said hub shell, and the second end of said sprocket body adjacent said second end region of said sleeve axle and outward from the second end of said hub shell;
    a second roller bearing positioned within the second end of said hub shell, inward of, said splines toward said first roller bearing, and interfacing between said hub shell and said sprocket body;
    a third roller bearing positioned within the second end of said hub shell, inward of said splines toward said first roller bearing, and interfacing between said sleeve axle and the first end of said sprocket body;
    clutch means for providing unidirectional torque coupling between said sprocket body and said hub shell, said clutch means positioned within said hub shell and inward of said splines and inward of the second and third roller bearings, toward said first roller bearing; said clutch means for coupling rotation of said sprocket body to rotation of said hub shell in a first direction of rotation, and allowing free rotation said hub shell relative to said sprocket body in a second direction of rotation;
    an axle, said axle disposed within said hole of said sleeve axle and protruding from the first and second end regions of said sleeve axle, said axle further protruding from said first end of said hub shell and from said second end of said sprocket body for providing clamp-engagable material.

2. A free-wheel hub according to claim 1 wherein said axle has a full length external diameter of at least 20 millimeters including the portion thereof within said sleeve axle. which resides within said sprocket body beneath said splines.

3. A free-wheel hub according to claim 1 wherein said clutch means includes a plurality of ramped teeth arranged radially on a surface at the first end of said sprocket body;
    a ring pawl having a plurality of ramped teeth arranged radially on a surface and interfacing the ramped teeth of the sprocket body; said ring pawl positioned within said hub shell and positioned between the first and second roller bearings; said ring pawl including lobes;

hub shell lobes integrally incorporated into said hub shell engaging the ring pawl lobes of said ring pawl and preventing relative rotation between said ring pawl while providing bearing surface support for said ring pawl and allowing axial movement of said ring pawl toward and away from said ramped teeth of said sprocket body; and spring means for urging said ring pawl toward said ramped teeth of said sprocket body.

4. A free-wheel hub according to claim 3 wherein said spring means includes a plurality of spring members residing within holes in said hub shell lobes urging said ring pawl toward said ramped teeth of said sprocket body;

said hub shell lobes are aluminum with a hard anodised coating for increasing resistance to wear by sliding movement of the ring pawl thereagainst.

5. A free-wheel hub according to claim 3 wherein said axle has a full length external diameter of at least 20 millimeters including the portion thereof within said sleeve axle which resides within said sprocket body beneath said splines.

6. A free-wheel hub for a bicycle comprising:

a hub shell, said hub shell a tubular member having a first end and a second end;

an axle having a first end region and a second end region; said axle extending through said hub shell; said hub shell rotatable relative to said axle;

a sprocket body having a first end and a second end and further having a central through bore; said sprocket body having sprocket wheel support means for receiving at least one sprocket wheel and torsionally coupling the sprocket wheel to said sprocket body; said sprocket body positioned about said axle with the first end of said sprocket body within the second end of said hub shell, and the second end of said sprocket body positioned about said second end region of said axle and outward from the second end of said hub shell;

a sleeve axle, said sleeve axle comprising a tubular member having a bore, said sleeve axle bore having a larger diameter than an external diameter of said axle so that said axle fits through said sleeve axle;

a first bearing interfacing between the first end of said hub shell and a first end of said sleeve axle;

a second bearing positioned within the second end of said hub shell, inward of said sprocket wheel support means toward said first bearing, and interfacing between said hub shell and said sprocket body;

a third bearing positioned within the second end of said hub shell, inward of said sprocket wheel support means toward said first bearing, and interfacing between said sleeve axle and the first end of said sprocket body;

clutch means for coupling rotation of said sprocket body to rotation of said hub shell in a first direction of rotation, and allowing free rotation said hub shell relative to said sprocket body in a second direction of rotation; said clutch means positioned within said hub shell and inward of said sprocket wheel support means and inward of the second and third bearings, toward said first bearing.

7. A free-wheel hub according to claim 6 wherein said axle has a full length external diameter of at least 20 millimeters including portions thereof which reside within said sprocket body beneath said sprocket wheel support means.

8. A free-wheel hub according to claim 6 wherein said clutch means includes a plurality of ramped teeth arranged radially on a surface at the first end of said sprocket body;

a ring pawl having a plurality of ramped teeth arranged radially on a surface and interfacing the ramped teeth of the sprocket body; said ring pawl positioned within said hub shell and positioned between the first and second roller bearings; said ring pawl including lobes;

hub shell lobes integrally incorporated into said hub shell engaging the ring pawl lobes of said ring pawl and preventing relative rotation between said ring pawl while providing bearing surface support for said ring pawl and allowing axial movement of said ring pawl toward and away from said ramped teeth of said sprocket body; and spring means for urging said ring pawl toward said ramped teeth of said sprocket body.

9. A free-wheel hub according to claim 8 wherein said spring means includes a plurality of spring members residing within holes in said hub shell lobes urging said ring pawl toward said ramped teeth of said sprocket body.

10. A free-wheel hub according to claim 9 wherein said axle has a full length external diameter of at least 20 millimeters including portions thereof which reside within said sprocket body beneath said sprocket wheel support means.

11. A free-wheel hub according to claim, 10 wherein said sprocket wheel support means includes splines.

\* \* \* \* \*